United States Patent [19]
Griffen et al.

[11] Patent Number: 5,369,226
[45] Date of Patent: Nov. 29, 1994

[54] LOAD SHIFT COMPENSATION FOR WEIGHING APPARATUS

[75] Inventors: Neil C. Griffen, Westerville, Ohio; Richard C. Loshbough, Spartanburg, S.C.

[73] Assignee: Mettler-Toledo, Inc., Worthington, Ohio

[21] Appl. No.: 55,719

[22] Filed: Apr. 29, 1993

[51] Int. Cl.$^5$ .......................... G01G 3/14; G01G 3/08; G01L 1/22
[52] U.S. Cl. .................................. 177/211; 177/229; 73/862.628
[58] Field of Search .............................. 177/211, 229; 73/862.628

[56] References Cited

U.S. PATENT DOCUMENTS

| | | | |
|---|---|---|---|
| 3,234,787 | 2/1966 | Ruge | 73/862.628 |
| 3,576,128 | 4/1971 | Lockery | 177/211 X |
| 4,380,175 | 4/1983 | Griffen | 177/211 X |
| 4,574,899 | 3/1986 | Griffen | 177/211 |
| 4,657,097 | 4/1987 | Griffen | 177/211 |
| 4,979,580 | 12/1990 | Lockery | 177/211 |
| 5,184,520 | 2/1993 | Naito | 73/862.628 X |

*Primary Examiner*—George H. Miller, Jr.

[57] ABSTRACT

Load shift compensation of a strain gage load cell is accomplished by connecting a pair of fixed resistors in series across the output of a bridge circuit incorporating the load cell strain gages. The junction point between the series resistors is established at a desired signal level by a digital to analog converter connected thereto or by a voltage divider network so that, in effect, a part of the resistance of the resistors required to achieve load shift compensation is made to shunt a pair of the strain gages in the bridge circuit. The required signal level may be established by positioning weights on the scale platter at different positions parallel to the longitudinal axis of the load cell beam and adjusting the signal level at the junction point between the shunting resistors until a desired degree of compensation is achieved. The digital correction value required at the input of the digital to analog converter to achieve compensation is stored in the memory of the scale computer.

9 Claims, 2 Drawing Sheets

LOAD SHIFT COMPENSATION FOR WEIGHING APPARATUS

BACKGROUND OF THE INVENTION

This invention relates to weighing scales utilizing strain gage load cells and more particularly to an improved method and apparatus for compensating such a weighing scale for changes in load position.

It is well known that inaccuracies may arise in weighing when the objects to be weighed are placed at different positions on a weight receiving platter. Such inaccuracies are referred to as "load position errors" and may be compensated in various ways. One of these methods has been to desensitize appropriate ones of the load cell strain gages connected in a bridge circuit. This is accomplished by connecting resistors of appropriate value in circuit with certain of the strain gages.

In U.S. Pat. No. 3,576,128 to Lockery, a dual beam load cell is compensated for changes in load position along the longitudinal axis of the beams by connecting shunt resistors across the strain gages at one end or the other of the load cell beams. In U.S. Pat. No. 4,380,175 to Griffen, a dual beam load cell is compensated for errors caused by changes in load position both parallel to the longitudinal axes of the beams and transverse to the axes by displacing the strain gages on the beams and connecting resistors of appropriate value in circuit with the strain gages. Such techniques have provided substantial improvement in compensating for load shift errors. A disadvantage in the use of resistors, however, remains in that resistors are typically manufactured in fixed values which rarely correspond to the values required for load shift compensation. This can result in the increased labor and expense of utilizing a number of resistors in parallel to arrive at the correct value. Further, the techniques for determining the correct compensating resistance values may be complicated and time consuming.

Recently, a weighing scale has been developed which, because of its design, requires load shift compensation of only one of its two load cells and only for load position changes parallel to one axis of the beams. This weighing scale is described and claimed in U.S. patent application Ser. No. 994,938, filed Dec. 22, 1992, and assigned to the Assignee of the present invention. The present invention is of particular use in scales such as this which require load shift compensation in only one direction.

SUMMARY OF THE INVENTION

An object of this invention is to provide a compensated weighing apparatus and method which substantially reduces or eliminates the disadvantages described above in utilizing resistors in circuit with strain gages to effect load shift compensation.

According to the present invention, the strain gages of a load cell are connected in a bridge circuit having a pair of output terminals and a pair of excitation terminals to which excitation signals are applied. A series resistor network is connected across the output terminals of the bridge circuit and a signal of the appropriate level is applied to a junction point in the series resistor network to achieve the compensation.

It will be seen that, if the signal at the junction point is made equal to the high or plus excitation level of the bridge, the two portions of the series resistor network are, in effect, connected in parallel with two of the strain gages in the bridge. If the signal level at the junction point is made equal to the low or minus excitation level of the bridge, the two resistance portions are, in effect, connected in parallel with the other two strain gages of the bridge. If the signal level at the junction point is changed, the effect is to change the values of the resistances connected across the strain gages. Thus, a series resistor network of two fixed resistors of equal value can be made to have the effect of two variable resistors in circuit with the strain gages by changing the signal level at their junction point.

The signal at the junction point may be provided by, for example, a potentiometer or other voltage divider connected between the high and low excitation levels of the bridge. Preferably, however, the signal level is established by the output of a digital to analog converter which has as its input a stored digital correction factor. The proper signal level and correction factor may be determined by positioning a load at various points parallel to the longitudinal axis of the load cell beams and adjusting the correction factor and, therefore, the signal level at the junction point until the required level of load shift compensation is obtained.

DESCRIPTION OF A PREFERRED EMBODIMENT

Figure 1:
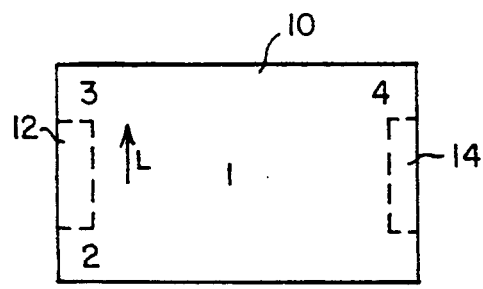
FIG. 1 is a diagrammatic plan view of the weighing platter of a scale embodying the present invention.

Referring initially to FIG. 1, there is shown a weighing platter 10 of a weighing scale such as that described in U.S. patent application Ser. No. 994,938, filed Dec. 22, 1992, and assigned to the Assignee of the present invention. A pair of load cells 12, 14 illustrated diagrammatically in FIG. 1 support weighing platter 10 as described in the aforesaid application Ser. No. 994,938. The weighing scale is designed and arranged such that one of the load cells, for example load cell 14, requires no load shift compensation. The other load cell, for example, load cell 12, requires compensation only for changes in load position in directions parallel to its longitudinal axis as shown by the arrow L in FIG. 1. The present invention provides significant advantage in load shift compensation of a scale requiring compensation in only a single direction.

Figure 2:
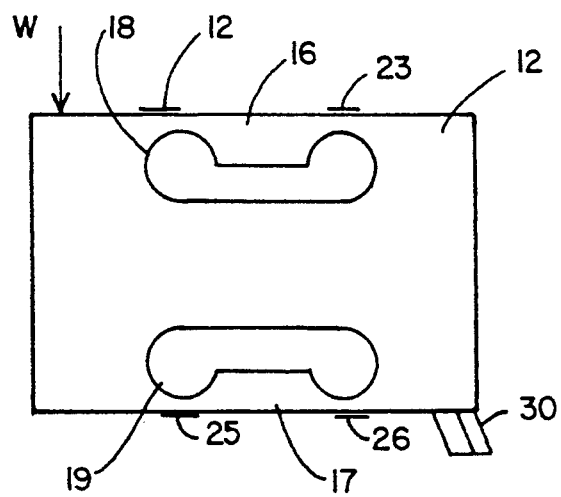
FIG. 2 is a side elevational view of one of the load cells employed in the scale of FIG. 1.

As shown in FIG. 2, load cell 12 is a dual beam load cell including an upper beam 16 and a lower beam 17 defined by cut out portions 18, 19 formed in a block of material such as aluminum or stainless steel. Upper beam 16 is provided with strain gages 22, 23 and lower beam 17 with a similar pair of strain gages 25, 26. When load cell 12 is supported at one end as shown at 30 and a weight W applied at its free end it will, as is well known, undergo S-shaped bending so that strain gages 23 and 25 will be placed in tension and strain gages 22 and 26 will be placed in compression. When connected in an electrical bridge circuit, the strain gages 22, 23, 25 and 26 produce an electrical signal proportional to the weight W.

Figure 3:
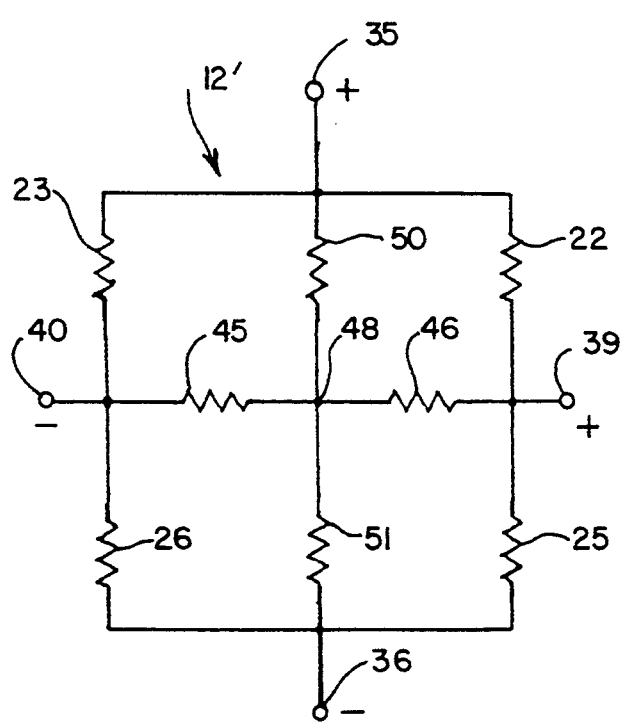
FIG. 3 is a schematic diagram of a bridge circuit incorporating the strain gages of the load cell in FIG. 2 and embodying the present invention.

Referring now to FIG. 3, the strain gages 22, 23, 25 and 26 of load cell 12 are shown connected in an electrical bridge circuit 12' with tension gages 23 and 25 in opposite legs of the bridge and compression gages 22 and 26 in the other pair of opposite legs of the bridge. The bridge is provided with electrical excitation at terminals 35, 36 and provides an output signal at terminals 39, 40 when the bridge becomes unbalanced by application of weight W.

As mentioned above, it is known that strain gage load cells may be compensated for changes in load position by connecting resistors of appropriate value in circuit with the strain gages. In accordance with the present invention, that principle is utilized in a new and advantageous manner. In accordance with this invention, a pair of fixed resistors 45, 46 is connected across output signal terminals 39, 40 and a circuit or other means is provided for establishing a required signal level at junction point 48 between resistors 45 and 46. In the bridge circuit of FIG. 3 the means provided for establishing the signal level at junction point 48 includes resistors 50, 51 which form a voltage divider between the excitation levels at terminals 35 and 36. It will be seen that if the signal level at junction point 48 is made equal to the excitation level at terminal 35, resistor 45 is directly shunting strain gage 23 and resistor 46 is directly shunting strain gage 22. Similarly, if the signal level at junction point 48 is made equal to the excitation level at terminal 36, resistor 45 is directly shunting strain gage 26 and resistor 46 directly shunts strain gage 25. If the signal level at junction point 48 is changed from either of these values the effect is to vary the amount of resistance of resistors 45 and 46 that shunts strain gages 23 and 22 or strain gages 25 and 26. By establishing the appropriate voltage level at junction point 48, the values of resistors 45 and 46 are, in effect, changed to the values required to shunt the appropriate pair of strain gages to desensitize the gages and achieve load shift compensation. Preferably, resistors 45 and 46 are of the same value. For typical strain gages having a nominal resistance of 350 ohms, resistors 45 and 46 may have a value of 10,000 ohms.

Voltage divider resistors 50 and 51 in FIG. 3 are shown as fixed, single resistors. Each of the resistors may, however, be a network of parallel resistors, each of which can be switched in or out of the circuit to change the signal level at junction point 48. Or, the resistors may be a potentiometer for establishing a desired signal level at junction point 48. Further, as mentioned above, other means may be provided in place of resistors 50, 51 or their alternate forms for establishing the required signal level at junction point 48. One such other means for establishing a desired signal level at junction point 48 is shown in FIG. 4 and described below.

Figure 4:
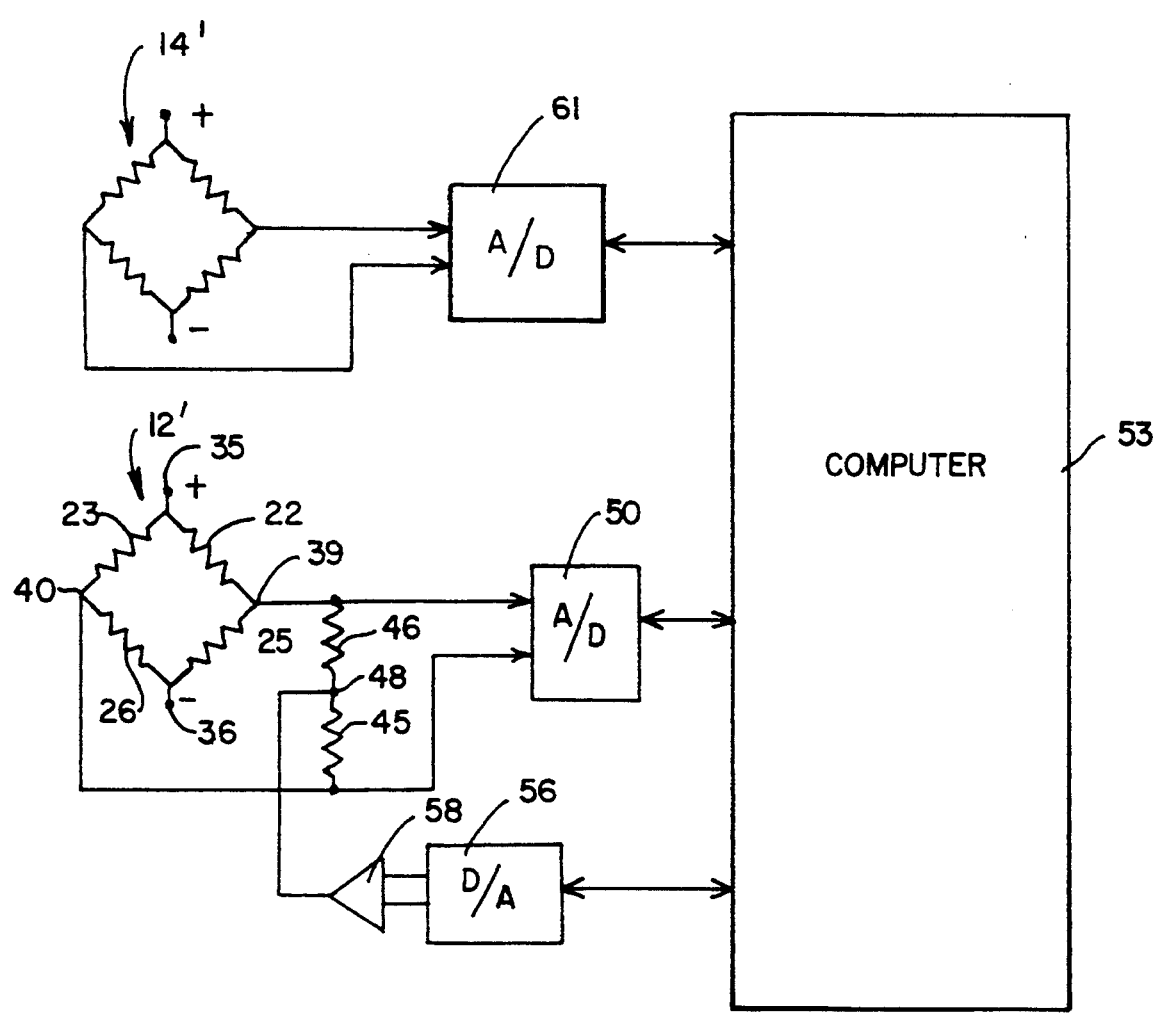
FIG. 4 is a schematic and block diagram of the scale of FIGS. 1 to 3 embodying a preferred form of the present invention.

FIG. 4 is a block diagram of the electrical portions of a weighing scale such as that described above in connection with FIG. 1. In FIG. 4, the bridge circuit 12' of FIG. 3 incorporating the strain gages of load cell 12 and including shunting resistors 45 and 46 is shown connected through an analog to digital converter 50 to a computer 53. A digital to analog converter 56 is shown connected through an amplifier 58 to junction point 48 between resistors 45 and 46. Converter 56 is used to establish the signal level at junction point 48 at a value between the high and low excitation levels of bridge 12' required to provide load shift compensation to load cell 12 with its strain gages 22, 23, 25 and 26. Converter 56 is used to determine the required signal level at junction point 48 in a manner to be described below and then maintains that signal level in accordance with a stored digital correction factor provided from computer 53.

As also shown in FIG. 4, a bridge circuit 14' for the strain gages of load cell 14 is connected through analog to digital converter 61 to computer 53. The total weight on the weighing platter 10 of FIG. 1 is determined by summing the outputs of analog to digital converter 61 and analog to digital converter 50. This summing and other control functions are accomplished by the program stored in computer 53 in a well known manner. As mentioned above, load cell 14 requires no load shift compensation and, accordingly, bridge circuit 14' does not require strain gage shunting resistors or a means to establish a predetermined desired signal level at the junction of the resistors. Load shift compensation for load cell 12 and its bridge circuit 12' is accomplished by determining and storing a digital correction value and providing it to the input of digital to analog converter 56. After the scale has been assembled, the digital correction value is determined as described below.

Referring to FIGS. 1 and 4, a test digital correction value is entered into computer 53 and provided to digital to analog converter 56 to set the signal level at junction point 48 at zero. A weight is then placed on weighing platter 10 at position 2 and the weight reading is recorded. The same weight is then placed at position 3 which is spaced longitudinally from position 2 and the weight reading is recorded. If the difference in readings is not within a predetermined tolerance, the signal level at junction 48 is adjusted by changing the test digital correction value in a direction to make the weight reading with the load at position 3 closer to the weight reading obtained with the load at position 2. A weight is again placed at positions 2 and 3, weight readings taken and changes made in the test digital correction value until the difference in weight readings between positions 2 and 3 is within tolerance. At that point the test digital correction value required at the input of digital to analog converter 56 to produce the desired degree of load shift compensation is stored in the memory of computer 53 for use in operation of the scale.

At this time a check is also made to see that the same weight reading is produced, within tolerance, for a weight at position 4 in FIG. 1 as at position 3. Although no load shift correction of load cell 14 is required, a weight placed at position 3 in FIG. 1 will be measured primarily by load cell 12 while the same weight placed at position 4 will be measured primarily by load cell 14. Small differences in load cell sensitivities could result in small differences in weight readings at the two positions. Any differences in weight readings between positions 3 and 4 that are not within a desired tolerance can be compensated in computer 53 by adjusting the digital output of either analog to digital converter 50 or analog to digital converter 61.

What is claimed is:

1. Weighing apparatus comprising at least one beam having a longitudinal axis and an axis transverse thereto, support means connected to one end of the beam, a receiver supported by the other end of the beam, strain gages mounted on the beam, means connecting the strain gages in a bridge circuit, a series resistor network connected across the output of the bridge circuit, and means connected to a junction point of the resistor network for establishing a predetermined signal to cause the output of the bridge circuit to be substantially independent of the position of a load on the load receiver in directions parallel to one axis of the beam.

2. Weighing apparatus as claimed in claim 1 wherein said signal establishing means includes a voltage divider network connected to the source of bridge excitation and having its output connected to said junction point.

3. Weighing apparatus as claimed in claim 1 wherein said signal establishing means includes a digital to analog converter and means storing a predetermined correction factor as the input to said digital to analog converter.

4. Weighing apparatus as claimed in claim 1 wherein said series resistor network includes a pair of resistors of fixed value and wherein said signal establishing means is connected to the junction of said resistors.

5. Weighing apparatus as claimed in claim 4 wherein said resistors are of equal value.

6. Weighing apparatus as claimed in claim 1 including two substantially parallel beams, means rigidly connecting said one end of the beams together and means rigidly connecting said other end of the beams together.

7. A method of load position compensating a weighing apparatus including a beam having a longitudinal axis and supporting a weight receiving member, strain gages mounted on the beam, and means connecting the strain gages in a bridge circuit, the method comprising the steps of connecting a series resistor network across the output of the bridge circuit, and establishing at a junction point of said network a predetermined signal level to cause the output of the bridge circuit to be substantially independent of the position of a load on the weight receiver in directions parallel to the longitudinal axes of the beam.

8. A method as claimed in claim 7 wherein said series resistor network includes first and second resistors of fixed equal value.

9. A method of load position compensating a weighing apparatus including a beam having a longitudinal axis and supporting a weight receiver, strain gages mounted on the beam, and means connecting the strain gages in a bridge circuit, the method comprising the steps of connecting a series resistor network across the output of the bridge circuit, connecting a signal source to a junction point of the resistor network, applying a load on the weight receiver at different positions parallel to the longitudinal axes of the beam, observing the output of the bridge circuit for each different load position, and adjusting the signal level at the junction point of the resistor network to make the output of the bridge circuit substantially independent of the position of the load in directions parallel to the longitudinal axis of the beam.

* * * * *